United States Patent [19]

Nield et al.

[11] Patent Number: 5,258,443
[45] Date of Patent: Nov. 2, 1993

[54] CURABLE AQUEOUS COMPOSITION COMPRISING A HIGH MOLECULAR WEIGHT SILANE FUNCTIONAL POLYMER AND A RELATIVELY LOW MOLECULAR WEIGHT SILANE FUNCTIONAL POLYMER

[75] Inventors: Eric Nield, Beaconsfield; Peter D. Palasz, Taplow, both of United Kingdom

[73] Assignee: Imperial Chemical Industries, PLC, London, England

[21] Appl. No.: 785,094

[22] Filed: Oct. 30, 1991

[30] Foreign Application Priority Data

Oct. 30, 1990 [GB] United Kingdom ............. 9023522.7

[51] Int. Cl.$^5$ ............................ C08K 3/20; C08K 5/06; C08F 8/00; B05D 1/02
[52] U.S. Cl. ................................... 524/501; 524/521; 524/369; 525/100; 427/428; 427/429
[58] Field of Search ................. 524/501, 521, 369; 525/100; 427/421, 428, 429

[56] References Cited

U.S. PATENT DOCUMENTS

| | | | |
|---|---|---|---|
| 3,567,499 | 3/1971 | Klebert et al. | 524/501 |
| 4,199,490 | 4/1980 | Kamiya et al. | 524/501 |
| 4,497,923 | 2/1985 | Lundberg et al. | 524/521 |
| 5,118,752 | 6/1992 | Chang et al. | 524/521 |
| 5,145,898 | 9/1992 | Narula et al. | 524/501 |

FOREIGN PATENT DOCUMENTS 1296136 11/1972 United Kingdom .

*Primary Examiner*—Melvyn I. Marquis
*Assistant Examiner*—Karen A. Dean
*Attorney, Agent, or Firm*—Cushman, Darby & Cushman

[57] ABSTRACT

A curable composition comprising:
- a) an aqueous dispersion of a Polymer having a MWt of at least 50,000, which is insoluble in water and which contains silane groups;
- B) a solution or dispersion of a Polymer which has a MWt between 300 and 20,000, comprising at least two silane groups and also comprising covalently bonded cationic hydrophilic groups the ratio of the Polymer (A) to the Polymer (B) being in the range 40:1 to 1:4.

16 Claims, No Drawings

CURABLE AQUEOUS COMPOSITION COMPRISING A HIGH MOLECULAR WEIGHT SILANE FUNCTIONAL POLYMER AND A RELATIVELY LOW MOLECULAR WEIGHT SILANE FUNCTIONAL POLYMER

This invention relates to an aqueous curable composition, its preparation and its use in a process of coating.

BACKGROUND OF THE INVENTION

Aqueous curable coating compositions which comprise polymers having hydrolysable silane groups are known. These compositions can form crosslinked coatings on removal of the water, either by subsequent reaction between the hydrolysable silane groups or alternatively by reaction of the silane groups with hydroxyl groups.

European Patent Application No. EP-A-280994 discloses electrodepositable coating compositions which comprise a polymer having ionic groups and hydroxyl groups and a crosslinking agent having at least two alkoxy silane groups. The polymer and crosslinking agent are dissolved or dispersed together in water.

A problem with compositions which rely for curing on reaction between silane groups and hydroxyl groups is that the resulting Si—O—C bond is polar and is unstable to moisture which gives rise to poor water resistance in the cured coating.

European Patent Application No. EP-A-276469 discloses an electrodepositable coating composition which comprises an aqueous dispersion or solution of a polymer having both ionic groups and alkoxy or hydroxy silane groups.

Published British Patent Application GB-A-2 215 339 discloses aqueous dispersions of a vinyl polymer which has a low level of silane functionality. Similar compositions are disclosed in British Patent GB-B-1407872.

British Patent GB-A-1,407,827 discloses aqueous dispersions of a vinyl polymer which has hydrolysable silane groups by virtue of the inclusion of a silane functional monomer during the process of making the polymer.

A problem with the use of polymers which are soluble in water and which contain hydrolysable silane groups is that these can only be made at relatively dilute solutions if they are to have a low viscosity. More concentrated solutions have an unacceptably high viscosity and are prone to premature intermolecular crosslinking and gellation.

A problem with dispersions of polymers having siloxane groups is that only low levels of silane can be incorporated into the polymer. The incorporation of higher levels of silane leads to ongoing intra-molecular crosslinking between silane groups within the dispersed particles. This results in very highly crosslinked particles which, on their own, are poor film-formers particularly at or near ambient temperature. The use of low levels of hydrolysable silane groups in the polymer leads to a low level of crosslinking in films formed from these compositions. This low level of crosslinking leads to poor final film properties such as poor water resistance and poor solvent resistance.

SUMMARY OF THE INVENTION

We have now discovered an aqueous composition which comprises a high molecular weight silane functional polymer in dispersion in an aqueous medium and which also comprises a relatively low molecular weight silane functional polymer dispersed or dissolved in the aqueous medium. This composition can be made to form cured films having a surprisingly improved balance of properties. The improved balance of properties includes a combination of good film formation, water resistance, solvent resistance and scratch resistance, together with good stability at a high solids content.

According to the present invention there is provided a curable composition comprising:

A) a stable dispersion in an aqueous medium of a First Polymer having a weight average molecular weight of at least 50,000, which is insoluble in water and which has covalently bonded silane groups of formula;

in which a is 0 to 2, $R^1$ is $C_{1-6}$ alkyl, and R is OH or a hydrolysable group, the groups of Formula (1) contributing from 0.05 to 2% by weight of silicon to the weight of the First Polymer; and B) a solution or dispersion in the aqueous medium of a Second Polymer which has a weight average molecular weight between 300 and 20,000, comprising at least two silane groups of formula (1), the groups of Formula (1) contributing between 0.2 and 16% by weight of silicon to the weight of Second Polymer, and also comprising covalently bonded cationic hydrophilic groups in an amount so as to render the Second Polymer soluble or self-dispersible in the aqueous medium, the non-volatile weight ratio of the First Polymer to the Second Polymer in the composition being in the range 40:1 to 1:4.

Preferably the non-volatile weight ratio of the First Polymer to the Second Polymer in the composition is from 30:1 to 1:3, more preferably from 25:1 to 1:2 and most preferably from 2:1 to 1:2.

DESCRIPTION OF PREFERRED EMBODIMENTS

The aqueous medium is one which predominantly comprises water. Preferably the aqueous medium is at least 60% by weight water, more preferably at least 75% by weight and most preferably at least 90% by weight. The balance of the aqueous medium can comprise water miscible organic solvents.

Examples of suitable water miscible organic solvents are glycol ethers such as propylene glycol monomethyl ether (available as Dowanol PM from Dow chemicals), $C_{1-4}$ alkyl alcohols such as methanol, ethanol, propan-1-ol and butan-1-ol, and N-methyl pyrrolidone.

The molecular weight of both of the Polymers can be measured by gel permeation chromatography (g.p.c.).

In the case of the First Polymer the molecular weight measurement is carried out by shaking a small sample (for example 50 mg) of the aqueous dispersion of First Polymer with about 10 cm³ of a strong solvent such as tetrahydrofuran. The molecular weight of the Second Polymer is carried out by dissolving a sample in a strong solvent such as tetrahydrofuran. The g.p.c. measurement is made on the resulting solution.

Usually there is a proportion of the First polymer which is insoluble in the solvent. This is often referred to as a 'gel fraction' and results from crosslinking within the dispersed particles of First Polymer. The gel fraction is usually between 5 and 80% by weight of the First polymer. The gel fraction is of very high molecular weight and is ignored in determining the molecular weight of the First Polymer.

Preferably the First Polymer has a weight average molecular weight, as measured by the above method, of greater than 70,000.

Preferably the silane groups of Formula (1) contribute from 0.1 to 2% by weight of silicon to the weight of the First Polymer and more preferably from 0.1 to 1.5% by weight.

The group R can be a hydrolysable group. A hydrolysable group is one which can be hydrolysed to give a hydroxyl group in the presence of water. Examples of suitable hydrolysable groups are $C_{1-6}$ alkoxy, $C_{2-4}$ alkoxy-$C_{2-4}$ alkoxy, $C_{2-4}$ alkanoyl, alkyl carboxy, enolate and oxime. Preferably in the groups of formula (1) R is $C_{1-6}$ alkoxy particularly methoxy or ethoxy.

Preferably $R^1$ is methyl or ethyl.

Preferably the First Polymer is a polyurea, polyurethane or an addition polymer, most preferably an addition polymer.

When the First Polymer is an addition polymer it comprises structural units and functional units. The structural units are derived from vinyl or acrylic monomers which do not have reactive groups. Examples of vinyl monomers which do not have reactive groups are vinyl acetate, vinyl versatate and styrene. Examples of acrylic monomers which do not have reactive groups are C1-10 alkyl esters of acrylic or methacrylic acid such as methyl methacrylate, ethyl methacrylate, propylmethacrylate, pentylmethacrylate, hexylmethacrylate, ethylacrylate, propylacrylate, butylacrylate, pentylacrylate, hexyl acrylate, octylacrylate and 2-ethylhexylacrylate.

Preferably the structural units are selected from C1-6 alkyl esters of acrylic or methacrylic acid and vinyl acetate, and most preferably are C1-4 alkyl esters of acrylic and methacrylic acids.

The structural units can also comprise a proportion of hydroxyl functional monomers, for example hydroxy $C_{2-6}$ alkyl acrylates or methacrylates. Suitable hydroxyl functional monomers are hydroxy ethyl acrylate, hydroxypropyl acrylate and hydroxyethyl methacrylate.

The structural units can also comprise a proportion of polyfunctional monomers which have two or more polymerisable double bonds. Examples of polyfunctional monomers are divinylbenzene, ethylene glycol dimethacrylate and pentaerithritol triacrylate. These polyfunctional monomers cause the polymer particles to be internally crosslinked. Preferably the polymer comprises no more than 5% by weight of structural units derived from polyfunctional monomers, more preferably no more than 2% by weight and most preferably no more than 0.5% by weight.

The functional units are derived from functional monomers having silane groups of formula (1).

Examples of suitable functional monomers are 3(trimethoxysilyl) propyl methacrylate, 3(triethoxysilyl) propyl methacrylate, 3(dimethoxymethyl silyl) propyl methacrylate, 2-(3-Cyclohexenyl) ethyltriethoxysilane, 3-butenyltriethyoxysilane and vinyl trialkoxy silanes such as vinyl trimethoxy silane and vinyl triethoxy silane. These monomers can also be used in a partially or fully hydrolysed form.

The First Polymer is held in stable dispersion by the presence of a stabiliser. The stabiliser comprises an anchor component covalently bonded to a hydrophilic component.

The hydrophilic component can be ionic or non-ionic, Preferably the hydrophilic component is non-ionic. A non-ionic hydrophilic component comprises an oligomeric or polymeric moiety which is water-soluble. Examples of suitable hydrophilic components are polyvinyl pyrrolidones of molecular weight 1000 to 10000, and poly(ethylene oxide) of molecular weight 200 to 10000.

Preferably the hydrophilic component is a poly(ethylene oxide) polymer of molecular weight 200 to 10000 more preferably between 400 and 5000 and most preferably 1000 to 2500. It is thought that the presence of a poly(ethylene oxide) polymer in the composition tends to inhibit reaction between silane groups in the composition and so increases the stability of the composition to premature crosslinking and gellation.

The anchor component can be associated with the First Polymer or can be covalently bonded to the First Polymer.

Suitable anchor components which can be associated with the First Polymer include alkyl and alkyl-aryl groups. Preferably the anchor component has at least 6 carbon atoms and more preferably at least 10 carbon atoms. Examples of suitable alkyl groups are $C_{8-20}$ alkyl such as octyl, nonyl, dodecyl and lauryl. Examples of suitable alkyl-aryl groups are $C_{8-20}$ alkyl phenyl and $C_{8-20}$ alkyl naphthenyl such as octyl phenyl, nonyl phenyl, dodecyl phenyl, lauryl phenyl and nonyl naphthyl groups. Examples of stabilisers having an anchor component which associates with the First Polymer are nonyl phenyl ethers of poly(ethylene oxide) of molecular weight 500 to 3000, preferably 1000 to 2500. One such stabiliser is commercially available as Levelan P208 from Lankro Chemicals.

Suitable anchor components which can be covalently bonded to the First Polymer, when the First Polymer is an addition polymer, are units derived from unsaturated groups such as acrylate, methacrylate, allyl or vinyl groups. These units can be incorporated into the First Polymer during its manufacture by including an acrylate, methacrylate, allyl or vinyl functional stabiliser precursor into the reaction mixture.

A stabiliser precursor comprises the hydrophilic component covalently bonded to an unsaturated group which can be polymerised into the monomer mixture when the First Polymer is formed.

Examples of suitable stabiliser precursors are poly(ethylene glycol) methacrylate, and the stabilisers derived from triallyl pentaerithritol disclosed in European Patent EP-B-0094386, the disclosure of which is herein incorporated by reference.

For the purposes of calculating the weight of the First Polymer, the stabiliser is considered to be part of the First Polymer.

Preferably the non-ionic stabiliser is present in an amount from 4 to 12% by weight based on the weight of the First Polymer.

A proportion of conventional ionic surfactant can be included in addition to the non-ionic stabiliser. Examples of conventional ionic surfactants are alkyl sulphates and sulphonates and alkyl aryl sulphonates.

Preferably any ionic surfactant is present in an amount of less than 2% by weight based on the weight of the First Polymer, more preferably less than 1% by weight.

Preferably when the First Polymer is an addition polymer it has a glass transition temperature, calculated on the basis of the Fox equation, of from $-10°$ to $40°$ C., more preferably from 0° to 30° C., and most preferably from 3° to 20° C.

Preferably the dispersion comprises particles of the First Polymer having a particle size in the range 50 to 500 nm, more preferably 90 to 200 nm and most preferably 90 to 150 nm.

The Second Polymer is soluble or self-dispersible in the aqueous medium. By soluble is meant that a test mixture of 2 ml of the aqueous medium and 50 mg of the Second Polymer gives no particle size reading on a Malvern Zetasizer particle size analyser (available from Malvern Instruments, England). By self-dispersible is meant that the second polymer will form a stable dispersion in the aqueous medium when neutralised without the need for further surface active agents. Preferably the Second Polymer is soluble in the aqueous medium.

Preferably the Second Polymer has a weight average molecular weight of between 350 and 15000, more preferably between 1000 and 15000, and most preferably between 1000 and 10000.

Preferably the silane groups of Formula (1) contribute between 0.5 and 8% by weight of silicon to the weight of the Second Polymer.

Examples of cationic hydrophilic groups are quaternary ammonium groups or acid addition salt groups. Examples of acid addition salt groups are protonated amine groups and protonated thioether groups. Preferably the cationic hydrophilic groups are protonated amine groups.

Acid addition salt groups are derived from acid addition salt-forming groups. Examples of acid addition salt-forming groups are amine groups and thioether groups.

When the cationic hydrophilic groups are protonated amine groups then the amine groups preferably contribute from 0.4 to 5% by weight of nitrogen to the weight of the Second Polymer, more preferably 0.54 to 5% by weight, and most preferably 0.7 to 5% by weight.

The Second Polymer can also comprise non-ionic hydrophilic groups. Examples of suitable non-ionic groups are pyrrolidone groups, hydroxyl groups and poly(ethylene oxide) segments of molecular weight 200 to 2000. The Second Polymer preferably comprises less than 6% by weight of non-ionic hydrophilic groups groups, preferably from 4 to 6% by weight.

The Second Polymer can be an addition polymer, a polyurethane polymer or a thioether polymer, or can be derived from an epoxy polymer, or a polyester polymer. Preferably the Second Polymer is an addition polymer, or is derived from an epoxy polymer.

When the Second Polymer is an addition polymer it comprises structural units, functional units, cationic hydrophilic units and, optionally, non-ionic hydrophilic units.

The structural units are derived from vinyl or acrylic monomers which do not have reactive groups. Examples of vinyl monomers which do not have reactive groups are vinyl acetate, vinyl versatate and styrene. Examples of acrylic monomers which do not have reactive groups are C1-10 alkyl esters of acrylic or methacrylic acid such as methylacrylate, ethylmethacrylate, propylmethacrylate, pentylmethacrylate, hexylmethacrylate, ethylacrylate, propylacrylate, butylacrylate, pentylacrylate, hexylacrylate, octylacrylate and 2-ethyl hexylacrylate.

Preferably the structural units are selected from C1-6 alkyl esters of acrylic or methacrylic acid and vinyl acetate, and most preferably are C1-4 alkyl esters of acrylic and methacrylic acids.

The functional units are derived from functional monomers having silane groups of formula (1). Examples of suitable functional monomers are 3(trimethoxysilyl) propyl methacrylate, 3(triethoxysilyl)propyl methacrylate, 3(dimethoxymethylsilyl) propyl methacrylate, 2-(3-Cyclohexenyl) ethyl triethoxysilane, 3-butenyltriethyoxysilane and vinyl trialkoxy silanes such as vinyl trimethoxy silane and vinyl triethoxy silane. Partially or fully hydrolysed derivatives of these monomers can also be used.

The cationic hydrophilic units are derived from monomers which carry cationic hydrophilic groups or acid addition salt-forming groups. An example of a monomer having an acid addition salt-forming group group is 2-aminoethylmethacrylate.

When the Second Polymer also comprises non-ionic hydrophilic units then these units are derived from monomers having a non-ionic hydrophilic group. Examples of monomers having a non-ionic hydrophilic group are poly(ethylene oxide) methacrylate of molecular weight 2,000, hydroxyethylmethacrylate and hydroxyethylacrylate.

When the Second Polymer is a thioether polymer then it can be an acid addition salt of a polymer of the general formula $$L-(CH_2)_m-(S)_n-(CH_2)_m-L$$

in which L is a silane group of formula (1), m is 1 to 6, preferably 3, and n is 1 to 6, preferably 1 to 4. Some of these thioethers are commercially available, for example bis (3-trimethoxysilyl propyl) thioether is available under the trademark Degussa 165 from Degussa Chemicals.

When the Second Polymer is derived from an epoxy polymer it can be the acid addition salt of a polymer derived from the reaction of an amino silane, or a mixture of an amino silane and a mercapto silane, with an epoxy functional polymer. In this case the cationic hydrophilic groups are protonated amine groups derived from the amino silane or protonated thioether groups derived from the mercapto silane.

Suitable amino silanes are compounds having an amine group and a silane group of formula (1). Examples of suitable amino silanes are gamma-aminopropyl trimethoxy silane, gamma-aminopropyl methyl dimethoxy silane and N-methyl gamma amino propyl trimethoxysilane, or partially or fully hydrolysed derivatives of these.

Suitable mercapto-silanes include gamma thiopropyl trimethoxysilane, or its partially or fully hydrolysed derivatives.

One suitable class of epoxy resins are those prepared by reacting an epihalohydrin, such as epichlorohydrin with a dihydroxyphenolic compound such as bis(4-hydroxyphenyl) methane (known as bisphenol F) or 2,2-bis(4-hydroxyphenyl) propane (known as bisphenol A). Many such epoxy resins are commercially available in a range of epoxy equivalent weights, particularly as 'Epikote' resins from Shell Chemicals Limited. These epoxy resins have the general formula;

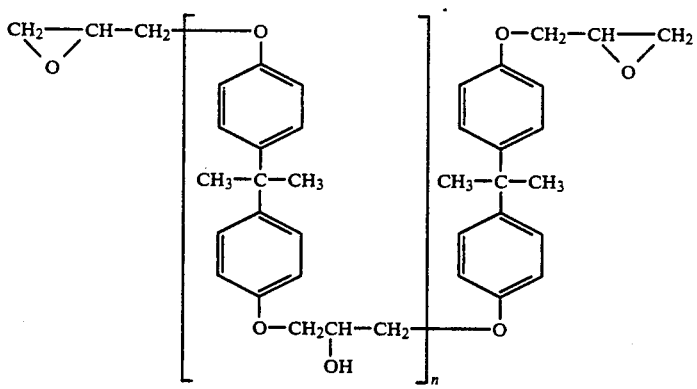

where n is preferably from 0 to 9 and may be non integral, e.g. 1.2. Preferred epoxy resins of this type have an epoxy equivalent weight of 100 to 2000. Particularly useful epoxy resins of this type are Epikote 880 (epoxy equivalent weight 192) and Epikote 1004 (epoxy equivalent weight 275).

The epoxy resin can be an extended epoxy resin which comprises a reaction product of a standard epoxy resins such as one of the Bisphenol A/epichlorohydrin type epoxy resin described above, with a chain extender. Chain extenders are materials which have two or more groups on them which can react with epoxide groups. The reaction of the chain extender with the epoxy resin results in an extended epoxy resin which is an epoxy functional material of higher molecular weight than the epoxy resin component. Suitable chain extenders include diols, for example caprolactone diol, diphenylol methane and diphenylol propane.

Another class of epoxy functional polymers which can be used to make the Second Polymer are epoxy functional addition polymers. Epoxy functional addition polymer comprise an addition polymer backbone having epoxide groups.

Suitable epoxy functional addition polymers comprise structural units, functional units and, optionally, non-ionic hydrophilic units.

The structural units are derived from vinyl or acrylic monomers which do not have reactive groups. Examples of vinyl monomers which do not have reactive groups are vinyl acetate, vinyl versatate and styrene. Examples of acrylic monomers which do not have reactive groups are C1-10 alkyl esters of acrylic or methacrylic acid such as methyl methacrylate, ethylmethacrylate, propylmethacrylate, pentylmethacrylate, hexylmethacrylate, ethylacrylate, propylacrylate, butylacrylate, pentylacrylate, hexylacrylate, octylacrylate and 2-ethylhexylacrylate.

Preferably the structural units are selected from C1-6 alkyl esters of acrylic or methacrylic acid and vinyl acetate, and most preferably are C1-4 alkyl esters of acrylic and methacrylic acids.

The functional units are derived from epoxy functional compounds having a polymerisable double bond such as vinyl, acrylic or methacrylic monomers for example as glycidyl methacrylate or vinyl glycidyl ether.

When the epoxy functional addition polymer also comprises non-ionic hydrophilic units then these units are derived from monomers having a non-ionic hydrophilic group. Examples of monomers having a non-ionic hydrophilic group are poly(ethylene oxide) methacrylate of molecular weight 2,000, hydroxyethylmethacrylate and hydroxyethylacrylate.

When the Second Polymer is a derived from polyester it can be the acid addition salt of the product of an amino silane, or a mercapto silane or a mixture of these, with an unsaturated polyester polymer. The amino silane or mecapto silane can be any of those mentioned above in relation to the epoxy polymer. In this case the cationic hydrophilic groups are protonated amine groups derived from the aminosilane or protonated thioether groups derived from the mercapto silane.

The unsaturated polyester polymer is a condensation polymer in which the polymer backbone contains activated unsaturated groupings of formula (2)

where R is hydrogen, or an alkyl or aryl group.

Particularly suitable polyester polymers are the products of obtained in known manner by reacting a dicarboxylic acid of the formula (3);

or an ester-forming derivative thereof with one or more polyols. Particularly suitable dicarboxylic acids are maleic and fumaric acids. Suitable ester-forming derivatives of these include the corresponding lower alkyl, for example methyl or ethyl esters and, in the case of maleic acid, the corresponding anhydride.

Suitable polyols include diols such as ethylene glycol, propylene glycol, 1-3 propane diol, butylene glycol, 1-4 butane diol, 1-6 hexane diol, neopentyl glycol, triols such as glycerol, trimethyl propane, trimethyl ethane, 1-2-6 hexane triol, tetraols such as pentaerythritol and higher polyols such as sorbitol. Mixtures of any two or more of these polyols may be employed.

In place of, or in addition to, a polyol there may be reacted with the carboxylic acid a compound containing two or more epoxy groups, for example a phenyl glycidyl ether type epoxy resin as described above in relation to the epoxy polymers.

In addition to the unsaturated dicarboxylic acid of the above formula, the reactants from which the polyester is made may also include one or more other poly carboxylic acids, for example saturated aliphatic dicarboxylic acids such as succinic acid, glutaric acid, adipic acid and suberic acid, and aromatic carboxylic acids such as phthalic acid, isophthalic acid, teraphthalic acid and trimellitic acid. Ester forming derivatives of such acids, for example phthalic anhydride, may be used in place of the free acids. Preferably at least 20% and most preferably at least 50% of the ester links in the polymer backbone of the polyester should be derived from unsaturated carboxylic acids.

The overall proportion of total hydroxyl group bearing reactants to total carboxyl group bearing reactants may be varied in accordance with principles well known in the polyester art. Usually a slight moderate excess of the polyol reactants are employed so as to produce a polyester having a low acid value, for example 15 to 25 mg KOH/g.

The compositions of the present invention can be made by mixing the Second Polymer with the dispersion of the First Polymer.

According to the present invention there is provided a method of making a composition as hereinbefore described which comprises mixing the Second polymer as as hereinbefore described with an aqueous dispersion of a First Polymer as hereinbefore described.

Preferably the composition is made by firstly forming a solution or dispersion in an aqueous medium of the Second Polymer and then mixing this solution or dispersion with the aqueous dispersion of the First Polymer.

The aqueous solution of Second Polymer is made in an aqueous medium as defined above.

Certain cationic hydrophilic groups, such as quaternary ammonium groups, are inherently ionised and polymers having these groups can be dissolved or dispersed in the aqueous medium without further treatment.

When the cationic hydrophilic groups are acid addition salt groups then the solution or dispersion of Second Polymer can be made by contacting a polymer having acid addition salt-forming groups with a suitable addition salt-forming acid. For example, when the acid addition salt groups are protonated amine groups or protonated thiol groups they can be formed from amine groups or thiol groups respectively by the addition of a suitable acid such as acetic or lactic acid. Usually the acid is added in an amount so as to result in a dispersion or solution of Second Polymer having a pH between 3 and 6.

The acid is preferably added to the Second Polymer before forming the aqueous solution or dispersion of the Second Polymer.

The solution or dispersion can be made by mixing the Second Polymer including any acid together with the aqueous medium and, if necessary, agitating the mixture, for example, by stirring.

Optionally, a compound containing a poly(ethylene oxide) moeity can be added to the mixture of the Second Polymer and the aqueous medium. The presence of a poly(ethylene oxide) moeity surprisingly appears to stabilise the hydrolysable silane groups on the Second Polymer against premature crosslinking and gellation. The stabilising effect is particularly noticeable in solutions of high solids content, which have a higher concentration of hydrolysible silane groups and which are thus particularly prone to gellation. The presence of a poly(ethylene oxide) moeity is also particularly useful if the solution of Second Polymer is to be left standing for some time before being mixed with the dispersion of First Polymer.

The stabilising effect of the poly(ethylene glycol) moeity is also carried over into the composition of the invention. Thus the presence of a poly(ethylene oxide) moeity is also paticularly useful where the stabiliser for the First Polymer does not itself contain a poly(ethylene oxide) moeity.

The aqueous solution or dispersion of Second Polymer which also comprises a compound containing a poly(ethylene oxide) moeity is novel.

According to the present invention there is also provided an aqueous solution or dispersion of a Second Polymer, as herein defined, which also comprises from 1 to 25% by weight, based on the weight of the Second Polymer, of a compound containing a poly(ethylene oxide) moeity.

Preferably the solution or dispersion of Second Polymer is a solution.

Preferably the solution or dispersion comprises from 2 to 15% by weight of the compound containing a poly(ethylene oxide) moeity, more preferably from 2 to 6% by weight.

Preferably the solution or dispersion comprises at least 0.2% by weight of the Second Polymer, more preferably at least 10% by weight and most preferably at least 15% by weight.

Preferably the poly(ethylene oxide) moeity has a molecular weight between 200 and 5000, more preferably between 300 and 3000 and most preferably between 1000 and 2500.

Examples of compounds containing a poly(ethylene oxide) moeity are alkyl, aryl and alkyl-aryl ethers of poly(ethylene oxide). Many alkyl, aryl and alkyl-aryl ethers of poly(ethylene oxide) are available as non-ionic stabilisers or surfactants.

Preferred compounds containing a poly(ethylene oxide) moeity are non-ionic surfactants or stabilisers. Preferably these have an HLB value (hydrophiliclypophilic balance) of between 10 and 18.2, more preferably between 10.5 and 17.1. HLB values for many of these compounds are given in a standard reference work "McCutcheon's emulsifiers and detergents" North American edition, 1986.

One particularly suitable compound is a nonyl phenyl ether of poly(ethylene oxide) available as Levelan P208 from Lankro Chemicals (Levelan is a trademark). Levelan P208 has an HLB value of about 16.

When the First Polymer is an addition polymer, the aqueous dispersion of the First Polymer can be made in a known manner by emulsion or dispersion polymerisation.

Preferably the First Polymer is made by emulsion polymerisation in an aqueous medium. The preferred emulsion polymerisation is carried out by a process in which the monomers are slowly fed into the aqueous medium together with a surfactant and a polymerisation initiator such as a mixture of hydrogen peroxide and ascorbic acid or a mixture of ammonium persulphate and sodium metabisulphite. The reaction mixture is stirred during the addition of the initiator and monomers so as to form an emulsion. The temperature of the reaction mixture is maintained at a temperature sufficiently high so as to cause polymerisation of the monomers, for example between 30° and 100° C.

In a particularly preferred process the polymerisation is preceded by a short prepolymerisation in which one or more of the monomers from which the structural units are derived are polymerised in the absence of monomers from which the functional units are derived.

The prepolymerisation produces polymer seeds onto which the particles of polymer dispersion form during the subsequent polymerisation.

Where the Second Polymer is an addition polymer it can be made by conventional methods such as solution polymerisation.

When the addition polymer is made by solution polymerisation it can be made by dissolving the appropriate monomers in a suitable solvent, adding a suitable polymerisation initiator such as azobisdiisobutyronitrile, and raising the temperature so that polymerisation occurs.

Alternatively the monomer mixture together with the initiator can be slowly added to a suitable solvent which is held at a suitable reaction temperature.

Suitable solvents include xylene, toluene and propylene glycol monomethylether. When a solvent which is not miscible with water is used, such as toluene or xylene, then the solvent must be removed before the Second Polymer can be dissolved or dispersed in water. Preferably a water miscible solvent such as propylene glycol monomethylether is used because then the resulting polymer solution can be dissolved or dispersed in water without removing the solvent.

When the Second Polymer is derived from an epoxy polymer it can be made by dissolving the amino silane, together with any mercapto silane, and the epoxy functional polymer in a suitable solvent, such as propylene glycol monomethyl ether and stirring the mixture at between 25° and 90° C. for between 1 and 5 hours.

Generally the amount of epoxy functional polymer used is such that the sum of the number of amine groups from the amino silane and any mercapto groups from any mercapto silane is equal to or less than the number of epoxy groups from the epoxy polymer.

When the Second Polymer is derived from an epoxy polymer which is itself an addition polymer, the epoxy polymer can be made by conventional methods such as solution polymerisation mentioned above with reference to making the Second Polymer when it is an Addition polymer.

When the Second Polymer is derived from a polyester polymer it can be made by dissolving the aminosilane, together with any mercapto silane and the unsaturated polyester polymer in a suitable solvent such as dipropyleneglycolmonomethylether and leaving the mixture to stand for example for 1-10 days at a temperature at which the two will react, for example 20°-30° C.

Generally the amount of polyester polymer used is such that the sum of the number of amine groups from the amino silane and any mercapto groups from any mercapto silane is equal to or less than the number of unsaturated groups of Formula (2) from the polyester polymer.

The unsaturated polyester polymer can be made by conventional methods, for example by heating the constituent monomers in solution in xylene to a temperature at which the xylene refluxes and removing water from the mixture as an azeotrope with the xylene.

When the Second Polymer is a quaternary ammonium functional polymer it can be made by quaternisation of the corresponding tertiary amine functional polymer. Quaternisation is well known in the art and can for example be carried out by reacting a tertiary amine group with an alkyl halide such as a $C_{1-6}$ alkyl chloride or bromide. Particularly useful alkyl halides are those which are have silane groups of formula (1) since these introduce added silane functionality as well as causing quaternisation. One example of such asilane functional alkyl halide is chloropropyl trimethoxy silane.

The composition can also comprise other conventional coating components such as pigments, fillers, thickeners, biocides and UV stabilisers. Preferably the composition is free of colloidal silica and most preferably totally silica free.

The compositions of the invention can be used to form cured coating films.

According to the present invention there is provided a process for forming a cured coating on a substrate which comprises the steps of;

(a) applying a layer of a curable composition as herein described to the surface of a substrate, and (b) allowing the layer to cure.

The curable composition can be applied to the surface of a substrate by conventional means such as brushing roller coating or spraying.

Suitable substrates include wood, steel, aluminium and glass. The layer can also be applied over a suitable basecoat or undercoat.

The layer can be cured either by allowing the aqueous phase to evaporate at room temperature or by heating for example to 70°-90° C. for 10 minutes.

The invention will now be further illustrated by means of the following examples:

EXAMPLES

1. Preparation of Aqueous Dispersions of the First Polymer 1.1 Aqueous Dispersions 1 to 6, 8 and 9

The following general method was used to make Aqueous Dispersions 1 to 6, 8 and 9. The quantities of monomers used are given in Table 1, together with the Tg of the polymers as calculated by the Fox equation.

Methylmethacrylate (20 g) and butyl acrylate (20 g) were added to a mixture of deionised water (400 g) and Levelan P208 (a stabiliser which is a nonyl phenyl ether of polyethylene glycol from Lankro Chemicals: 6.4 g) at 40° C. under nitrogen with stirring. After 15 min. aqueous hydrogen peroxide solution (20% vol., 0.96g in 5g water), and aqueous ascorbic acid solution (0.11 g in 5 g water) were separately added and the mixture was stirred for 55 minutes at 40° C. The monomer mixtures given in Table 1 were added over a period of 3 hours.

Simultaneously with the addition of the monomers, aqueous hydrogen peroxide solution (20%, 9.96 g in 68 g water) and aqueous ascorbic acid solution (1.04 g in 76 g water) were each separately added over the same 3 hour period. The mixture was stirred at 40° C. for 1 hour, cooled to 20° C. and then filtered through an 80 μm mesh. The resulting dispersions had a non-volatile content of 40% and had good stability. The particle size was 120-140 nm as measured by a Malvern Zeta sizer from Malvern Instruments, England).

1.2 Aqueous Dispersions 7

The following method was used to make Aqueous Dispersion 7. The quantities of monomers used are given in Table 1, together with the Tg of the polymer as calculated by the Fox equation.

Methylmethacrylate (20 g) and butyl acrylate (20 g) were added to a mixture of deionised water (400 g) and Levelan P208 (6.4 g) at 40° C. under nitrogen with stirring. After 15 min. aqueous hydrogen peroxide solution (20% vol., 0.96 g in 5 g water), and aqueous ascorbic acid solution (0.11 g in 5 g water) were separately added and the mixture was stirred for 55 minutes at 40°

C. At this stage the remaining 3-(trimethoxysilyl) propyl methacrylate (3.5 g) was added in one portion. The rest of the monomers were added over a period of 3 hours.

Simultaneously with the addition of the monomers, aqueous hydrogen peroxide solution (20%, 9.96 g in 68 g water) and aqueous ascorbic acid solution (1.04 g in 76 g water) were each separately added over the same 3 hour period. The mixture was stirred at 40° C. for 1 hour, cooled to 20° C. and then filtered through an 80 μm mesh. The resulting dispersions had a non-volatile content of 40% and had good stability. The particle size was 142 nm as measured by a Malvern Zeta sizer from Malvern Instruments, England).

TABLE 1

| Dispersion | Silane Monomer (g) | MMA (g) | BA (g) | TG (°C.) | % Si |
|---|---|---|---|---|---|
| 1 | 3.5 | 154.93 | 151.32 | 3 | 0.11 |
| 2 | 0.0 | 155.76 | 154.65 | 3 | 0.00 |
| 3 | 1.5 | 150.16 | 128.56 | 3 | 0.04 |
| 4 | 10.5 | 153.79 | 145.78 | 3 | 0.30 |
| 5 | 21.0 | 151.94 | 137.91 | 3 | 0.60 |
| 6 | 33.1 | 156.70 | 140.30 | 3 | 1.09 |
| 7 | 3.5 | 154.93 | 151.32 | 3 | 0.11 |
| 8 | 3.35 | 161.45 | 128.26 | 10 | 0.11 |
| 9 | 3.35 | 181.9 | 107.77 | 20 | 0.11 |

The following abbreviations are used in Table 1:
Silane monomer is 3(trimethyloxysilyl) Propyl methacrylate (A174 from Union Carbide).
MMA is methyl methacrylate
BA is butyl acrylate
%Si is the calculated percentage by weight of silicon in the polymer.

The weight average molecular weights were determined by shaking a small sample (50 mg) of the aqueous dispersion of First Polymer with 10 cm³ of tetrahydrofuran. A gel permeation chromatograghic determination of molecular weight was carried out on the non-gelled portion. The molecular weights are given in Table 2.

TABLE 2

| Aqueous Dispersion Of First Polymer | Weight Average Molecular Weight |
|---|---|
| 1 | 200,000 |
| 2 | 1,678,250 |
| 3 | 79,771 |
| 4 | 339,125 |
| 5 | 112,521 |
| 6 | 5,886,414 |
| 7 | 7,048,456 |
| 8 | 930,854 |
| 9 | 323,272 |

2. Preparation of Aqueous Solution or Dispersions of Second Polymer

The weight average molecular weights of the Second polymers were measured on a Waters GPC using Polymer Labs PI 5 μ mixed gel columns calabrated against polystyrene standards.

2.1 Preparation of Second Polymer 1

Second Polymer 1 is an epoxy-derived polymer which is the product of reaction between a bisphenol A/Epichlorohydrin type epoxy resin and an aminosilane.

a) Preparation of polymer

Epikote 880 (a bisphenol A/Epichlorohydrin type epoxy resin of epoxy equivalent weight 192 from Shell Chemicals, 106.5 g) was mixed with N-methylaminopropyltrimethoxysilane (127 g)* and Dowanol PM (dipropyleneglycolmonomethylether from Dow Chemicals; 80 g) at 25° C. with stirring and under nitrogen. Stirring was continued for 1 hour, the temperature was raised to 50° C. and the mixture was stirred for 3 hours. The resulting polymer had a calculated silicon content of 7.3% by weight, a calculated nitrogen content of 3.65% by weight and a weight average molecular weight of 1,700.

*Dynaslan 1110 (Trademark) from Huls.

b) Preparation of aqueous solution

The resulting mixture was cooled to 25° C. and a portion (239 g) was mixed with glacial acetic acid (25 g), followed by slow addition of water (1424 g) over 5 minutes with rapid stirring. The product was an aqueous solution which was clear to the unaided eye and which was stable on storage at ambient temperature for over one year.

2.2 Preparation of Second Polymer 2

Second Polymer 2 is a polyester polymer derived from the reaction of an unsaturated polyester with an aminosilane.

a) Preparation of an unsaturated polyester resin

Dianol 33 (a Bisphenol A/propylene oxide adduct from Akzo Chemicals; 38.5 g), trimethylol propane(1.0 g), maleic anhydride (11.4 g), Fascat 4101 a butyl chlorotin dihydroxide esterification catalyst from M&T Chemicals UK; 0.013 g) and xylene (5 g) were mixed and heated to about 90° C. The water evolved was collected using a Dean-Stark apparatus.

When the resulting unsaturated polyester polymer had an acid value of 22 mg KOH the heat was removed and on cooling to 80° xylene (24.5 g) and Dowanol PM (24.5 g) were added.

The solvent mixture was removed under reduced pressure and Dowanol PM (54 g) was added, resulting in a product of 60% non-volatile content.

b) Preparation of Second Polymer

N-methylaminopropyltrimethoxysilane (75 g) was added with stirring to the a portion of the mixture as prepared in (a) above (253.g) and was allowed to stand at ambient temperature for 7 days. The resulting polymer had a calculated Silicon content of 4.2% by weight, a calculated nitrogen content of 2.1% by weight and a weight average molecular weight of 8,129.

c) Preparation of aqueous dispersion

The product from (b) above (6 g) was mixed with glacial acetic acid (1 g), Levelan P208 (0.5 g) and water (18 g). The resulting milky white dispersion was stable at ambient temperature for 3 months.

2.3. Preparation of Second Polymers 3 to 7

Second Polymers 3 to 7 are acrylic polymers made using an amine functional monomer and a silane functional monomer.

a) Preparation of polymers

The following general method was used to make Second Polymers 3 to 7. The quantities of monomers used are given in Table 3, together with the silicon content as a percentage by weight for each.

A mixture of the monomers shown in Table 3 and azodiisobutyronitrile (5% by weight of the monomer mixture) was added to a charge of Dowanol PM (400 g) over 2 hours at 105° C. under nitrogen with stirring. The mixture was stirred for a further 2 to 3 hours until the non-volatile content reached 50%. The mixture was allowed to cool to ambient temperature.

The weight average molecular weights of the acrylic polymers produced by this method were 5,645 to 7,691. The glass transition temperature (Tg) of all the polymers was 10° C. as calculated by the Fox equation.

TABLE 3

| Polymer | DMAE (g) | Silane Monomer (g) | MMA (g) | EA (g) | Si % | N % |
|---------|----------|--------------------|---------|--------|------|-----|
| 3 | 7 | 2 | 65.86 | 126.14 | 0.11 | 0.32 |
| 4 | 7 | 20 | 69.9 | 106.5 | 1.11 | 0.32 |
| 5 | 10 | 2 | 63.82 | 124 | 0.11 | 0.44 |
| 6 | 14 | 2 | 63.82 | 124 | 0.11 | 0.62 |
| 7 | 14 | 20 | 67.28 | 102.72 | 1.11 | 0.62 |

The following abbreviations are used in Table 3:
DMAE is dimethylaminoethyl methacrylate.
Silane monomer is gamma-methacryloxypropyl-trimethoxy-silane.
MMA is methyl methacrylate.
EA is ethyl acrylate.
Si% is the calculated percentage by weight of silicon in the polymer.
N% is the calculated percentage by weight of nitrogen in the polymer.

b) Preparation of aqueous solutions

Each of the above polymers (30 g) was mixed with glacial acetic acid (3 g) followed by the careful addition of water (2.5 g) with rapid mixing. It was found that only polymers 6 and 7 would form solutions in water, the other polymers only formed a white bitty two phase mixture.

2.4 Preparation of Second Polymer 8

Second Polymer 8 is a polymer derived from the reaction product between an epoxy functional acrylic polymer and an aminosilane.

a) Preparation of Epoxy Functional Addition Polymer

A mixture of methyl methacrylate (189 g), butyl acrylate (171 g), glycidyl methacrylate (40 g) and azodiisobutyronitrile (20 g) was added to Dowanol PM (400 g) over 2 hours at 105° C. under nitrogen with stirring. The mixture was stirred for a further 2 to 3 hours until the non-volatile content reached 50%. The mixture was allowed to cool to ambient temperature.

b) Preparation of Second Polymer 8

The epoxy acrylic as prepared in (a) above (200 g) was mixed with N-methylaminopropyltrimethoxy-silane (12.5 g) at room temperature for 10 minutes, and the mixture was heated to 80° C. under an atmosphere of nitrogen for 3 hours. The product was allowed to cool to room temperature. The polymer was calculated to contain 1.70% Silicon by weight and 0.85% nitrogen by weight. The weight average molecular weight of the Second Polymer produced by this method was 7446.

c) preparation of aqueous solution.

The polymer from (b) above (25 g) was mixed with glacial acetic acid (1.2 g), and water (50 g) was added to the mixture. This resulted in a translucent solution of Second Polymer 8.

2.5 Preparation of Second Polymer 9

Second Polymer 9 is an epoxy acrylic polymer derived from the reaction product between an epoxy functional acrylic polymer and an aminosilane.

a) Preparation of Epoxy Functional Addition Polymer

A mixture of methyl methacrylate (912.4 g), butyl acrylate (376.4 g), glycidyl methacrylate (511 g) and butyl peroxy-2-ethyl hexanoate (commercially available from Akzo Chemie UK as Triganox 21S: 55 g) was added to Dowanol PM (1200 g) over 3 hours at 120° C. under nitrogen with stirring. The mixture was stirred for a further 4 hours with the addition of 3 further proportions of Triganox 21S (3 portions of 6 g each) at half hour intervals until the non-volatile content reached 60%. The mixture was allowed to cool to ambient temperature.

b) Preparation of Second Polymer 9

The polymer from (a) above (41.6 g) was mixed with N-methylaminopropyl trimethoxysilane (3.34 g) and Dowanol PM (8.3 g) at room temperature for 10 minutes, then the mixture was heated to 80° C. under an atmosphere of nitrogen for 1 hour. The product was allowed to cool to room temperature. The resulting polymer was calculated to contain 1.24 mol/kg of unreacted epoxide groups, 1.70% Silicon by weight, 0.85% Nitrogen by weight, had a weight average molecular weight of 8,953.

c) Preparation of aqueous solution

Glacial acetic acid (1.5 g) and Levelan P208 (1.5 g) was added and the mixture was stirred for 3 minutes. Water (25 g) was added with stirring followed by further water (79 g) and ethanol (25 g). The product was a translucent aqueous solution.

2.6 Preparation of aqueous solution of Second Polymer 10

A commercial sample of Degussa 165 (Bis(3-trimethoxy silylpropyl) thioether available from Degussa Chemicals; 3 g) was mixed with acetic acid (0.5 g) followed by water (6 g) over a period of 10 minutes. The product was a clear aqueous solution. This polymer had a weight average molecular weight of 358.6 and a silicon content of 15.6% by weight.

2.7 Preparation of Second Polymer 11

Second Polymer 11 is an epoxy-derived polymer which is the product of reaction between a bisphenol A/Epichlorohydrin type epoxy resin with an aminosilane and 3-mercaptopropyltrimethoxysilane in a 1:1 ratio.

a) Preparation of polymer

Epikote 880 (a bisphenol A/Epichlorohydrin type epoxy resin of epoxy equivalent weight 192 from Shell Chemicals; 100.0 g) was mixed with gamma-mercaptopropyl trimethoxysilane (commercially available from Union Carbide as A189; 50.5 g), N-methylaminopropyl-trimethoxysilane (available from Huls as Dynaslan 1110; 50.6 g) and Dowanol PM (40 g) at 25° C. with stirring and under nitrogen. Stirring was continued for 1 hour, the temperature was raised to 60°-75° C. and the mixture was stirred for a further 2 hours. The polymer product had a calculated silicon content of 7.3% by weight and a calculated nitrogen content of 1.75% by weight.

b) Preparation of aqueous solution

The mixture from (b) above was cooled to 25° C. and glacial acetic acid (40 g) was added, followed by slow addition of water (1800 g) over 5 minutes with rapid stirring. The product was an aqueous solution which was clear to the unaided eye and which was stable on storage at ambient temperature for over one year.

2.8 Preparation of Polymer 12

Second polymer 12 is an epoxy derived polymer which is the product of reaction between a bisphenol A/epichlorohydrin type epoxy resin with an amino silane.

a) Preparation of polymer

Epikote 1001 (a bisphenol A/epichlorohydrin type epoxy resin of epoxy equivalent weight 475 commercially available from Shell Chemicals, 200 g) was mixed with Dowanol PM (100 g) and heated to 70° C. with stirring. After one hour the Epikote had fully dissolved. On cooling the solution to 25° C., gamma-aminopropyltriethoxysilane (available from Union Carbide as A1100; 75.53 g) was added. After mixing the components for 2 hours, the product was heated to 65° C. for 2 hours. On cooling, the resulting product had a calculated silicon content of 3.8% by weight, a calculated nitrogen content of 1.9% by weight and a weight average moecular weight of 8403.

b) Preparation of aqueous solution 5 g of the product made in (a) above was neutralised with acetic acid (2 g), and mixed with Levelan P208 (1 g), and Dowanol PM (2.5 g) with rapid stirring. Water (22.5 g) was added slowly to the mixture.

3 Compositions and Testing

Various blends of Aqueous Dispersions 1 to 9 and Second Polymers 1 to 12 were made, and tested as follows.

3.1 Testing the Compositions

The Compositions were evaluated for their performance as coatings by applying a layer of the Composition to a clean glass substrate using a 400 μm block spreader, so as to form a thin film. The film was allowed to dry overnight and then the following tests and observations were made:

(i) Pencil Test

Deionised water was placed on the film to be evaluated. The water was left in contact with the film for 1 hour and then wiped off with a soft cloth so as to give a dry surface. Using an Erichsen Pencil Hardness Tester (available from The Erichsen Company of Germany) with a bodyweight of 684 g, a 6B pencil was rubbed across the film once in each direction along the same track.

If the pencil penetrated right through the film then this was deemed a fail (F). If the pencil did not penetrate right through the film then this was deemed a pass (P).

(ii) Stain Test and Scratch Test

Deionised water was placed on the film to be evaluated. The water was left in contact with the film for 1 hour and then wiped off using a soft cloth so as to leave a dry surface. The film was visually evaluated for staining and an attempt was made to scratch the surface with a finger nail. The film was compared to a portion of the film which had not been exposed to water.

The staining was rated as follows:
A = No change
B = Slight haze
C = Film very cloudy
D = Could not see through film
E = The film disintegrated The scratch test was evaluated as follows:
A = No change
B = Slightly softer
C = Finger nail made impression in film
D = Film lifted from the substrate
E = Film distintegrated (iii) Mek Rubs In the Mek rub test, each coating was rubbed back and forth with a rag soaked in methyl ethyl ketone (MEK). A single back and forth movement was counted as one rub. After a number rubs, the coated surface became visible through the coating when viewed through an opticle microscope at ten fold magnification. The number of rubs needed for this to happen is recorded and is an indication of the solvent resistance of the coating. Generally the test is only carried out to a maximum of 200 rubs. Anything surviving at least 200 rubs is given a rating of >200.

(iv) Film Formation Test

The film was examined by eye and rated as follows:
4 = Film contains 3-5 mm cracks
3 = Film contains larger cracks
2 = Slight cracking
1 = Smooth glossy film 3.2. Compositions 1 to 7

Various aqueous dispersions of First Polymer were mixed with the aqueous solution of Second Polymer 1 (an epoxy polymer) from 2.1(b) above in a 4:1 non-volatile weight ratio as follows:

TABLE 4

| Compositions | First Polymer | | |
|---|---|---|---|
| | Number | Tg | % Si |
| 1 (Comparative) | 2 | 3 | 0 |
| 2 | 3 | 3 | 0.04 |
| 3 | 1 | 3 | 0.11 |
| 4 | 4 | 3 | 0.3 |
| 5 | 5 | 3 | 0.6 |
| 6 | 8 | 10 | 0.11 |
| 7 | 9 | 20 | 0.11 |

In Table 4, %Si means calculated percentage by weight of silicon in the polymer weight, and Tg is the glass transition temperature as calculated by the Fox equation.

Composition 1 is not according to the invention since Aqueous Dispersion 2 does not contain silane groups.

The First Polymers of Compositions 1 to 5 have the same Tg but contain different amounts of silicon by non-volatile weight.

Compositions 3, 6 and 7 contain the same amount of silicon but have a different Tg.

TABLE 5

| Test Results for Compositions 1 to 7 | | | | | |
|---|---|---|---|---|---|
| Composition | Film Formation | Mek Rubs | Pencil | Stain | Scratch |
| 1 (Comparative) | 1 | 60 | F | C | C |
| 2 | 1 | 150 | P | A | A |
| 3 | 1 | >200 | P | A | A |
| 4 | 1 | >200 | P | A | A |
| 5 | 1 | >200 | P | A | A |
| 6 | 1 | >200 | P | B | C |
| 7 | 1 | >200 | P | B | C |

It can be seen from these results that Compositions 2 to 7 according to the invention show improved MEK Rub resistance and scratch resistance over Composition 1 in which the First Polymer does not contain silane groups.

3.3. Compositions 8 to 15

Composition 8 was a mixture of Second Polymer 7 (an acrylic polymer: 30 g), glacial acetic acid (3 g) and water (60 g). Compositions 9 to 13 and were blends of this mixture with Aqueous Dispersion 1 at various non-volatile ratios. Composition 14 was aqueous dispersion 1 alone. Composition 15 was essentially the same as Composition 11 with the exception that Second Polymer of Composition 15 was Second polymer 6. The compositions are summarised as follows:

TABLE 6

| Composition | Non-volatile ratio of Aqueous Dispersion 1: Second Polymer |
|---|---|
| 8 (Comparative) | 0:1 |
| 9 | 1:4 |
| 10 | 1:1.6 |
| 11 | 2.5:1 |
| 12 | 10:1 |
| 13 | 25:1 |
| 14 (Comparative) | 1:0 |
| 15 (Comparative) | 2.5:1 |

Composition 8 was not according to the invention since it did not contain any Aqueous Dispersion of First Polymer. Composition 14 was not according to the invention as it did not contain any Second polymer. Composition 15 was not according to the invention since Second Polymer 6 contains only 0.1% by weight of silicon.

TABLE 7

Test Results for Compositions 10-15

| Composition | Film Formation | Mek Rubs | Pencil | Stain | Scratch |
|---|---|---|---|---|---|
| 8 (Comparative) | 1 | 79 | F | C | E |
| 9 | 1 | 130 | P | B | B |
| 10 | 1 | >200 | P | B | B |
| 11 | 1 | >200 | P | B | B |
| 12 | 1 | >200 | P | B | B |
| 13 | 1 | >200 | P | B | B |
| 14 (Comparative) | 2 | 39 | F | C | C |
| 15 (Comparative) | 2 | 40 | F | D | E |

It can be seen from these results that Composition 9 to 13 according to the invention showed improved Mek Rub resistance and water resistance over Compositions 8, 14 and 15 which were not according to the invention.

3.4. Comparative Compositions 16 and 17

Compositions 16 and 17 comprised Aqueous Dispersion 4 to which various amounts of monofunctional silane compounds were added as given in Table 8.

TABLE 8

| Composition | Aqueous Dispersion 4 (g) | Water (g) | Glacial Acetic Acid (g) | MAPS (g) | TEOS (g) |
|---|---|---|---|---|---|
| 16 (Comparative) | 10 | 1 | — | 1.0 | — |
| 17 (Comparative) | 10 | 0.22 | 0.14 | — | 0.14 |

The following abbreviations are used in Table 8:
MAPS is Methylaminopropyltrimethoxysilane
TEOS is Tetraethylorthosilicate Compositions 16 and 17 were not according to the invention as they did not contain a second polymer having at least two silane groups.

TABLE 9

Test Results for Compositions 16 and 17.

| Composition | Film Formation | Mek Rubs | Pencil | Stain | Scratch |
|---|---|---|---|---|---|
| 16 (Comparative) | 2 | 65 | F | D | E |
| 17 (Comparative) | 2 | 56 | F | D | E |

3.5 Compositions 18 to 21

Compositions 18 to 21 show the use of various different types of Second Polymer together with aqueous dispersion 4. The compositions were made having a ratio between the First Polymer and the Second Polymer of 2.7:1. The Second polymers used and their general type is summarised in Table 10.

TABLE 10

| Composition | Second Polymer Number | Second Polymer Type |
|---|---|---|
| 18 | 9 | Epoxy-acrylic polymer |
| 19 | 2 | Polyester polymer |
| 20 | 12 | epoxy polymer |
| 21 | 10 | Thioether polymer |

TABLE 11

Results of testing Compositions 18 to 21.

| Composition | Film Formation | Mek Rubs | Pencil | Stain | Scratch |
|---|---|---|---|---|---|
| 18 | 1 | >200 | P | A | A |
| 19 | 1 | >200 | P | A | A |
| 20 | 1 | >200 | P | A | A |
| 21 | 1 | >200 | P | A | A |

It can be seen that each of these compositions forms films having good appearance, and good resistance to solvent, water and scratching.

3.6 Composition 22

Composition 22 was a mixture of first Polymer 4 and second Polymer 11 in a 4:1 non-volatile ratio.

TABLE 12

Results of testing composition 22

| Film Formation | MEK Rubs | Pencil | Stain | Scratch |
|---|---|---|---|---|
| 1 | >200 | P | A | A |

4 The stability of solutions or dispersions of Second Polymer

In order to demonstrate the effect of a compound containing a poly(ethylene oxide) moeity on the storage stability of aqueous solutions or dispersions of Second Polymer, various solutions or dispersions of Second Polymer were made up in water, both with and without Levelan P208. Levelan P208 is a nonyl phenyl ether of poly(ethylene oxide) having an HLB value of 16, commercially available from Lankro Chemicals. The solutions or dispersions were of a slightly different composition from those given above, and the composition of the solutions or dispersions, in grams, used in these tests is given in Table 13.

TABLE 13

| Second Polymer No. | Weight | Dowanol PM | Glacial Acetic Acid | Levelan P208 | Water |
|---|---|---|---|---|---|
| 2 | 3 | 0 | 1 | 0.0 | 11.0 |
| 2 | 3 | 0 | 1 | 0.7 | 10.3 |
| 8 | 10 | 0 | 1 | 0.0 | 23.0 |
| 8 | 10 | 0 | 1 | 1.0 | 23.0 |
| 12 | 5 | 10 | 2 | 0.0 | 15.0 |
| 12 | 5 | 10 | 2 | 1.0 | 15.0 |

The solutions were visually inspected over a period of 48 hours, and the results are summarised in Table 14.

TABLE 14

| Second Polymer Solution | Observations |
|---|---|
| 1 | Viscous gel after 12 hours |
| 2 | No change over 48 hours |
| 3 | Viscous gel after 12 hours |
| 4 | No change over 48 hours |

TABLE 14-continued

| Second Polymer Solution | Observations |
| --- | --- |
| 5 | Viscous gel after 12 hours |
| 6 | No change over 48 hours |

We claim:

1. A curable composition comprising:
   A) An aqueous medium;
   B) A first polymer stably dispersed in said aqueous medium, said first polymer having a weight average molecular weight of at least 50,000 and being insoluble in water, said first polymer having covalently bonded silane groups of the Formula (1):

in which a is 0 to 2, $R^1$ is $C_{1-6}$ alkyl, and R is OH or a hydrolizable group, the groups of Formula (1) contributing from 0.05 to 2% by weight of silicon to the weight of said First polymer; and
   C) A second polymer dissolved or dispersed in said aqueous medium, said second polymer having a weight average molecular weight between 300 and 20,000, comprising at least two silane groups of Formula (1), the groups of Formula (1) contributing between 0.2 and 16% by weight of silicon to the weight of said second polymer, and said second polymer also comprising covalently bonded cationic hydrophilic groups in an amount sufficient to render said second polymer soluble or self dispersible in the aqueous medium, the non-volatile weight ratio of said first polymer to said second polymer being in the range 40:1 to 1:4.

2. A composition according to claim 1 in which the non-volatile weight ratio of the First Polymer to the Second Polymer is from 30:1 to 1:3.

3. A composition according to claim 1 in which the groups of Formula (1) contribute from 0.1 to 2% by weight of silicon to the weight of the First polymer.

4. A composition according to claim 1 in which R is $C_{1-6}$ alkoxy, $C_{2-4}$alkoxy-$C_{2-4}$alkoxy, $C_{2-4}$alkanoyl, enolate or oxime.

5. A composition according to claim 1 in which the First Polymer is an addition polymer.

6. A composition according to claim 1 dispersion by the presence of a non-ionic stabiliser which comprises a poly(ethylene oxide) polymer.

7. A composition according to claim 1 in which the groups of formula (1) contribute from 0.5 to 8% by weight of silicon to the weight of the Second Polymer.

8. A composition according to claim 1 in which the Second Polymer is soluble in water.

9. A composition according to claim 1 in which the cationic hydrophilic groups on the Second Polymer are protonated amine groups.

10. A composition according to claim 9 in which the amine groups contribute from 0.4 to 5% by weight of nitrogen to the weight of the Second Polymer.

11. A composition according to claim 1 in which the Second Polymer is an addition polymer or a thioether polymer, or is derived from an epoxy polymer or a polyester polymer.

12. A composition as claimed in claim 11 in which the Second Polymer is an addition polymer or is derived from an epoxy polymer.

13. A process for making a curable composition as claimed in claim 1 which comprises mixing a Second Polymer as defined in claim 1 with an aqueous dispersion of a First Polymer as defined in claim 1.

14. A process for forming a cured coating on the surface of a substrate which comprises the steps of;
   (i) applying a layer of a curable composition according to claim 1, and
   (ii) allowing the layer to cure.

15. A substrate which has been coated by the process of claim 13.

16. An aqueous solution or dispersion of a second polymer said second polymer having a weight average molecular weight between 300 and 20,000 and comprising at least two silane groups of Formula (1):

in which a is 0 to 2, $R^1$ is $C_{1-6}$ alkyl, and R is OH or a hydrolizable group, the groups of Formula (1) contributing between 0.2 and 16% by weight of silicon to the weight of said second polymer, and said second polymer also comprising covalently bonded cationic hydrophilic groups in an amount sufficient to render said second polymer soluble or self dispersible in an aqueous medium, said second polymer containing a poly(ethylene oxide).

* * * * *